United States Patent
Yoon et al.

(10) Patent No.: US 9,225,905 B2
(45) Date of Patent: Dec. 29, 2015

(54) IMAGE PROCESSING METHOD AND APPARATUS

(71) Applicant: Samsung Electronics Co., Ltd., Gyeonggi-do (KR)

(72) Inventors: Youngkwon Yoon, Seoul (KR); Wonhyung Cho, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 144 days.

(21) Appl. No.: 13/957,832

(22) Filed: Aug. 2, 2013

(65) Prior Publication Data

US 2014/0036108 A1    Feb. 6, 2014

(30) Foreign Application Priority Data

Aug. 3, 2012    (KR) ........................ 10-2012-0085169

(51) Int. Cl.
*H04N 5/232*    (2006.01)

(52) U.S. Cl.
CPC ....... *H04N 5/23293* (2013.01); *H04N 5/23229* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 6,995,793 B1 | 2/2006 | Albadawi et al. | |
| 2005/0213830 A1 | 9/2005 | Nagashima | |
| 2006/0197849 A1* | 9/2006 | Wernersson | 348/231.99 |
| 2006/0264733 A1 | 11/2006 | Masaki | |
| 2007/0285736 A1* | 12/2007 | Han Ching | 358/474 |
| 2010/0231735 A1 | 9/2010 | Burian et al. | |
| 2011/0109766 A1 | 5/2011 | Roh et al. | |
| 2011/0261217 A1* | 10/2011 | Muukki et al. | 348/222.1 |
| 2012/0057063 A1 | 3/2012 | Wang et al. | |
| 2012/0120278 A1 | 5/2012 | Kunishige et al. | |
| 2012/0172086 A1 | 7/2012 | Choi et al. | |
| 2012/0218453 A1* | 8/2012 | Hosokawa | 348/333.11 |
| 2013/0021504 A1* | 1/2013 | Plowman et al. | 348/241 |
| 2013/0208143 A1* | 8/2013 | Chou et al. | 348/231.99 |
| 2013/0222671 A1* | 8/2013 | Tseng et al. | 348/333.11 |
| 2014/0078343 A1* | 3/2014 | Dai et al. | 348/231.99 |

FOREIGN PATENT DOCUMENTS

| | | |
|---|---|---|
| JP | 2005-277908 A | 10/2005 |
| JP | 2006-211392 A | 8/2006 |
| JP | 2012-105160 A | 5/2012 |
| KR | 10-2011-0051344 A | 5/2011 |
| KR | 10-2011-0052275 A | 5/2011 |
| WO | 2009/089525 A1 | 7/2009 |

* cited by examiner

*Primary Examiner* — Justin P Misleh
(74) *Attorney, Agent, or Firm* — Cha & Reiter, LLC.

(57) ABSTRACT

An image processing method and apparatus that minimizes a delay time until the image is detected and captured when shooting photographs where various shooting options (effects) are set. The image processing method includes displaying a preview in a shooting mode; receiving a shooting option based shooting command while displaying the preview; and processing image compensation applying a shooting option to an image having full resolution as a background, and substantially parallel operations, entering a preview mode to display a preview a display image.

17 Claims, 12 Drawing Sheets

400

800

IMAGE PROCESSING METHOD AND APPARATUS

CLAIM OF PRIORITY

This application claims the benefit of priority under 35 U.S.C. §119(a) from a Korean patent application filed on Aug. 3, 2012 in the Korean Intellectual Property Office and assigned Serial No. 10-2012-0085169, the entire disclosure of which is hereby incorporated by reference in its entirety.

BACKGROUND

1. Field of the Invention

The present disclosure relates to an image processing method and an apparatus thereof for processing an image in a camera device or a portable device including a camera module. More particularly, the present invention relates to an image processing method and apparatus that minimizes a delay time until the image is detected and captured.

2. Description of the Related Art

In recent years, a camera device or a portable terminal (hereinafter referred to as 'portable device') including a camera module is becoming better able to provide a higher quality images and/or various user convenience functions. The portable device having a shooting function by a camera module may detect images having full HD resolution or greater through an image sensor (or camera sensor).

In addition, the portable device displays an image detected from the camera sensor as a preview image in a preview mode. If the user presses a shutter button, the preview image is captured. In this case, the portable device detects, captures, processes, and stores an image acquired from the image sensor in a memory in response to the shutter button input, and there is a delay time (e.g., shot to preview time) from the storage termination of the image in a memory to a next possible shooting time (that is, from input of the shutter button to next possible shooting time for another photo). The delay time may be generated due to the influence of a shooting environment of a subject and an image processing power. Accordingly, the user must wait next shooting until image processing is terminated according to the delay time. Thus, when one wants to take a series of successive photos, this delay is inconvenient and can inhibits capturing the subject at various successive times, which may be desirable of the subject or something else is in motion. Further, recently, the image of the subject may be captured by setting various shoot options according to a user setting. For example, the user may set a sketch effect, a shade effect, a distortion effect, a synthesis effect, an animation effect, a black and white effect, a vignetting effect, composition variation and background variation for improving image quality, panorama shooting to perform shooting. The image shot according to the shooting option may be achieved by processing image conversion as a shooting option set to a full captured image is post-processing compensated. Accordingly, a delay time from an input of a shutter button by the user to next possible time where an image can be captured when shooting according to shooting option setting in the portable device is significantly increased as compared with general shooting. Accordingly, the user must inconveniently wait for the end of a time period that is longer than usual for capturing images with certain post-processing compensation than when generally shooting images with selecting additional options.

SUMMARY

The present invention has been made in part in view of the above problems, and provides an image processing method that enables image conversion and rapid entry of a subsequent shooting operation without reducing convenience for a user by rapidly processing image conversion to minimize a delay time between successive image captures upon a shooting operation based on a shooting option of a portable device, and an apparatus thereof.

The present invention further provides an image processing method that improves convenience for the user and usability of a portable device having a shooting function by implementing an optimal environment for minimizing a delay time according to shooting in the portable device.

In accordance with an exemplary aspect of the present invention, an image processing method can include: displaying a preview in a shooting mode; receiving a shooting option based shooting command while displaying the preview; and processing image compensation applying a shooting option to an image having full resolution as a background, and simultaneously, entering a preview mode to display a preview of a display image.

In accordance with another exemplary aspect of the present invention, there is provided a computer readable recording medium recording a program for executing the method by hardware such as a processor, microprocessor or control unit.

In accordance with still another exemplary aspect of the present invention, an image processing apparatus can include: a camera module acquiring an image having a full resolution, scaling the acquired image having full resolution to buffer and output through a display image buffer, and buffering and outputting the image having full resolution through a still image buffer; a display unit for displaying a preview of the display image output from the camera module; a memory storing at least one program and an effect preview image to which a shooting option is applied based on the display image and an image to which the shooting option is applied based on the image having full resolution; and a controller executing the at least one program to process image compensation applying the shooting option to the image having full resolution when a shooting option based shooting command is received while displaying a preview of the display image, and simultaneously, entering a preview mode to display a display a preview of the display image.

In accordance with yet another exemplary aspect of the present invention, a computer readable recording medium stores a program. When the program is loaded into hardware such as a processor or processor of a device for execution of machine executable code the program, the device converts an image acquired through a camera module into a display image and an image having full resolution to buffer the converted display image and the converted image having full resolution, displaying a preview of the buffered display image, processes image compensation applying a shooting option to the image having full resolution as a background when a shooting option based shooting command is received while displaying the preview of the display image, and simultaneously or at least during an overlapping time, entering a preview mode to display a preview based on a display image of a next frame.

BRIEF DESCRIPTION OF THE DRAWINGS

The above features and advantages of the present invention will become more apparent from the following detailed description in conjunction with the accompanying drawings, in which.

DETAILED DESCRIPTION

Figure 1:
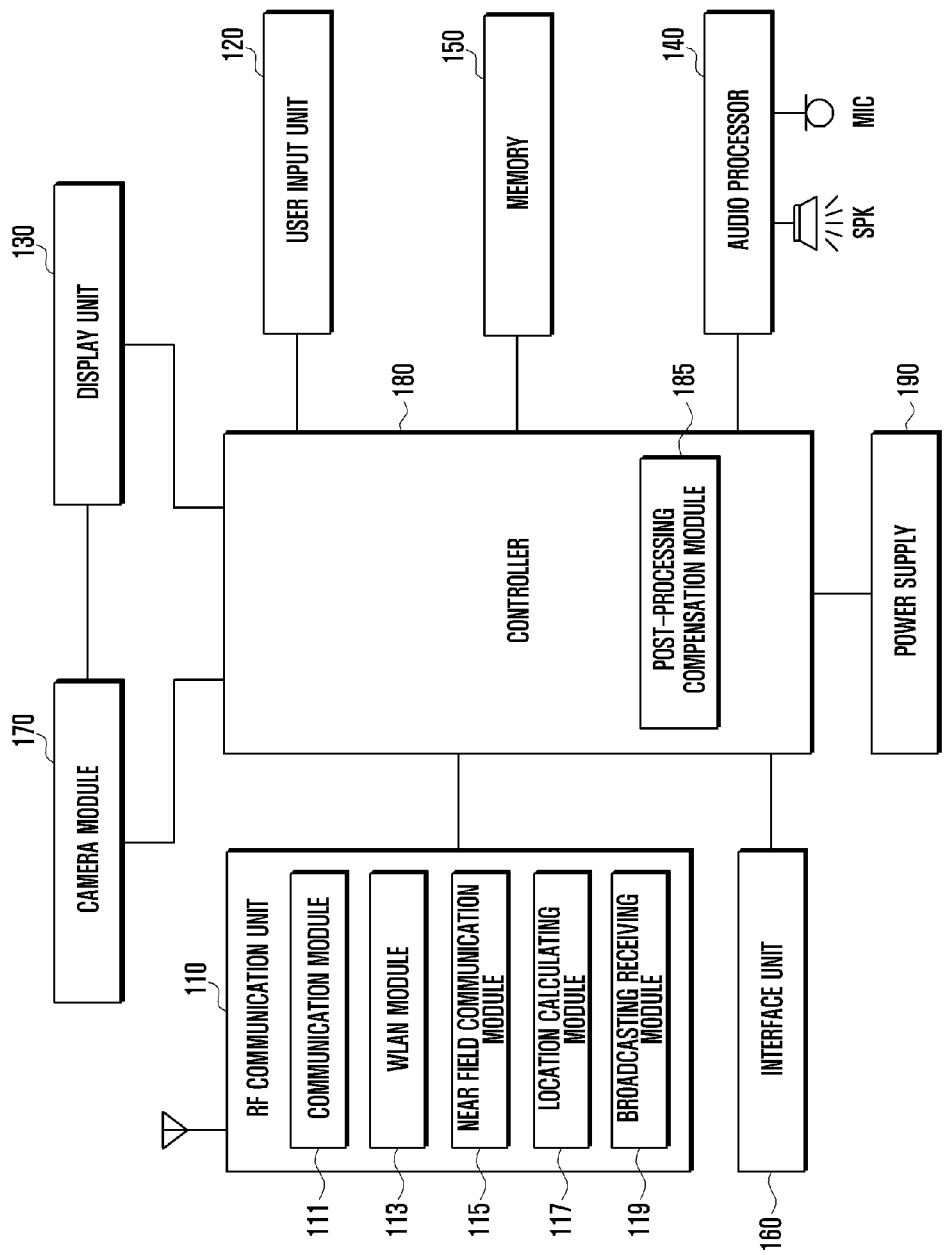
FIG. 1 is a block diagram schematically illustrating a configuration of a portable device according to an exemplary embodiment of the present invention.

Exemplary embodiments of the present invention are described herein below with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

The present invention provides an image processing method and an apparatus thereof in a camera device or a portable terminal (hereinafter referred to as 'portable device'). Particularly, an exemplary embodiment of the present invention provides a method and apparatus for processing image in a photograph shooting scheme experiencing an image captured in a new form through an image post-processing correction such as image synthesis or various filter processing. In other words, in this exemplary embodiment of the present invention a method and an apparatus for processing an image can detect, capture, process, and store the image during shooting execution where various shooting options (or effects) are set in a memory, and minimize a delay time (e.g., shot to preview time) until shooting is again possible (in other words, after input of a shutter button it is then possible to capture (shoot) another image).

In the exemplary embodiment of the present invention, the shooting option may include an effect option such as, for example, sketch, shade, distortion, synthesis, animation, vignetting, vintage, color conversion, and luminescence; and an effect option such as composition for improving image quality, a background capable of changing a background of a subject, and panorama capable of shooting a wide viewing angle. According to this exemplary embodiment of the present invention, the shooting option as described above may be implemented in a plug-in form. For example, the user may induce development of various shooting options and easily update various shooting options in the portable devices by selecting and downloading various shooting options, and installing them in the portable device.

According to this exemplary embodiment of the present invention, the portable device processes an image for each frame acquired from a camera module during driving the camera module (e.g., upon entering a preview mode) to generate a display image for preview display and the whole image (or still image) having full resolution for capture. The display image may have a size smaller than or the same size as that of the still image. In this case, the portable device may acquire an image from the camera module for each frame, convert the acquired image into a display image to be displayed as a preview, display the display image on a display unit, and buffer an image having a full resolution acquired from the camera module to store it as a still image. Further, in the foregoing state, if a capture is requested, that is, when a shutter button is input, the portable device may select an image of a frame at a time point when the capture is requested (that is, when the shutter button is input) from images of buttered frames, and compression-encode and store the selected image of a frame.

Accordingly, this exemplary embodiment of the present invention may include a buffer for temporarily storing an image having full resolution (or still image) independently (in parallel) from an operation of displaying the display image in a preview mode, and a function (application) for processing background of image conversion such as a post-processing correction of the image having full resolution.

By the aforementioned arrangement hereinabove, during driving of the camera module, the portable device may buffer an image having full resolution in the buffer. Further, when the image capture (shooting) due to input of a shutter button is requested from the user, the portable device may select a frame image of a capture request time point from frames images buffered through the buffer and process the selected frame image as a background. Particularly, this exemplary embodiment of the present invention may independently (in parallel) operate a shooting function (or application) for shooting in a shooting scheme where a shooting option is set and a correction function (or application) for compensating an image, processes correction with respect to an image having full resolution as a background, and directly returns to a preview mode by the shooting application to display a preview of a display image as a preview. The image correction by the correction application may progress as a background function until a corresponding task is terminated, and which may continuously progress although after the shooting application has terminated.

Further, according to this exemplary embodiment of the present invention, the portable device may return a progress degree (e.g., a progress situation with respect to how many percentages the image conversion is progressed) with respect to image conversion processing progressed as a background or a progress situation with respect to the image conversion including how many tasks of all accumulated tasks are progressed and how many tasks remain to the user. In this case, when a shooting application is in progress, the feedback may be provided on an execution picture of a shooting application.

If the shooting application is terminated, the return may be provided through a User Interface (UI) or a Graphical UI (GUI) set to one region of a given execution picture (e.g., idle picture, gallery picture, and other application execution pictures).

Meanwhile, hereinafter, an image having full resolution (or still image) represents an image acquired from a camera module, and can represent an image where scaling with respect to the image acquired through the image sensor is not achieved. In addition, the display image represents an image displayed on a display unit in a preview mode, and may represent an image obtained by scaling an image acquired through an image sensor according to a preset size (or resolution). Meanwhile, the captured image represents an image to be stored as a still image, and can represent an image having full resolution acquired through the image sensor or a display image obtained by scaling the image acquired from the image sensor to a preset size.

Further, in this exemplary embodiment of the present invention, the image scaling may represent controlling an image having full resolution to a preset size (or resolution). In the exemplary embodiment of the present invention, the image scaling may be implemented by a resizing scheme, and an addition and averaging scheme. The resizing refers to a scheme of controlling the size of an image by decimating, interpolating, and cropping the image. Further, the addition and averaging scheme refers to a scheme of controlling the number of pixels by generating adjacent pixels as one pixel, and after the averaging scheme is performed, decimation, interpolation, and crop may be performed.

Hereinafter, a configuration and an operation control method of a portable device according to an exemplary embodiment of the present invention will now be described with reference to following drawings. A configuration of the portable device according to an exemplary embodiment of the present invention is not limited to following contents, but are applicable to various exemplary embodiments based on the following exemplary embodiments.

FIG. 1 is a block diagram schematically illustrating a configuration of a portable device according to an exemplary embodiment of the present invention.

Referring now to FIG. 1, the portable device of the present invention in this example preferably includes a radio frequency (RF) communication unit 110, a user input unit 120, a display unit 130, an audio processor 140, a memory 150, an interface unit 160, a camera module 170, a controller 180, and a power supply 190. Since the constituent elements shown in FIG. 1 are not essential, a portable device 100 having greater or fewer constituent elements of the present invention may be implemented within the spirit and scope of the claimed invention. For example, when the portable device according to an exemplary embodiment of the present invention, in the case where the portable device does not support a separate communication function, a configuration of the RF communication unit 110 may be omitted.

The RF communication unit 110 may include at least one module that enables wireless communication between the portable device and a wireless communication system and between the portable device and a network in which other portable devices are located. For example, the RF communication unit 110 can comprise include a mobile communication module 111, a Wireless Local Area Network (WLAN) module 113, a short range communication module 115, a location calculation module 117, and a broadcasting receiving module 119. It should be understood that each of these modules include hardware such as a processor or microprocessor, transmitter, receiver, transceiver, and an encoder/decoder circuitry, storage, etc.

The mobile communication module 111 transceives a wireless signal to at least one of a base station, an external device, and a server. The wireless signal may include, for example, an audio call signal, an image call signal, or various types of data according to transception of character/multimedia. The mobile communication module 111 may communicate with a server to download a plug-in type shooting option and an image compensation application according to user selection under control of the controller 180. The mobile communication module includes hardware such as a processor or microprocessor, transmitter, receiver, transceiver, and an encoder/decoder circuitry, storage, etc.

The WLAN module 113 connects with a wireless Internet and forms a wireless LAN link with other electronic devices, which may be mounted inside or outside the portable device. A wireless LAN (Wi-Fi), Wibro (Wireless broadband), a Wimax (World Interoperability for Microwave Access), and an HSDPA (High Speed Downlink Packet Access) may be used as a wireless internet technology. The WLAN module 113 may connect with a server such as a market to download a plug-in type shooting option and an image compensation application according to user selection under control of the controller 180. Further, when the portable device forms a WLAN link with another electronic device (which may or may not be another portable device), the WLAN module 113 may transmit and receive photographic data according to user selection to and from another electronic device. The WLAN module 113 may transmit and receive photograph data according to user selection to and from a cloud server, and includes hardware such as a processor or microprocessor, transmitter, receiver, transceiver, and an encoder/decoder circuitry, storage, etc.

The short range communication module 115 is a module for near field communication. Bluetooth, Radio Frequency Identification (RFID), Infrared Data Association (IrDA), Ultra Wideband (UWB), ZigBee, and Near Field Communication (NFC) are some non-limiting examples of a short range communication technology that the short range module 115 can use. When the portable device couples via short range communication with another electronic device, the short range communication module 115 may transmit or receive photograph data according to user selection to or from another electronic device, and includes hardware such as a processor or microprocessor, a transmitter, receiver, transceiver, and an encoder/decoder circuitry, storage, etc.

With continued reference to FIG. 1, the location calculating module 117 is a module for acquiring a location of the portable device. For example, the location calculating module 117 includes a Global Position System (GPS) module. The location calculation module 117 can calculate distance information from at least three base stations and exact time information, apply the calculated information to triangulation so that three-dimensional current location information according to latitude, longitude, and altitude. The location calculation module 117 can continuously receive a current location of the portable device from at least three satellites in real time to calculate location information, an includes hardware such as a processor or microprocessor, a transmitter, receiver, transceiver, and an encoder/decoder circuitry, storage, etc. The location information of the portable device may be acquired by various schemes.

The broadcasting receiving module 119 receives a broadcasting signal (e.g., TV broadcasting signal, radio broadcasting signal, data broadcasting signal) and/or information associated with the broadcasting (e.g., broadcasting channel, broadcasting program or broadcasting service provider) from an external broadcasting management server through a broadcasting channel (e.g., satellite channel, terrestrial channel), and hardware such as a processor or microprocessor, a transmitter, receiver, transceiver, and an encoder/decoder circuitry, storage, etc.

The user input unit 120 generates input data for controlling an operation of the portable device. The user input unit 120 may include a key pad, a dome switch, a touch pad (constant pressure/capacitive), a jog wheel, and a jog switch. The user input unit 120 may be implemented outside the portable device in the form of buttons, and some buttons may be implemented by a touch panel.

The display unit 130 displays (outputs) information processed by the portable device. For example, when the portable device is in a call mode, the display unit 130 displays User Interface (UI) or Graphical UI (GUI) associated with a call. Further, when the portable device is in an image call mode or a shooting mode, the display unit 130 displays shot and/or received image, UI, or GUI. Particularly, during drive of the camera module 170, the display unit 130 comprises hardware such as a display screen and associated circuitry for outputting images as directed by the controller 180, and can display various UIs and GUIs associated with an operation of a shooting function. In other words, the display unit 130 may perform a function which displays an image shot through the camera module 170 and information during shooting. For example, the display unit 130 may display a preview image received from the camera module 170, and a preview image (effect preview image) where a shooting option (e.g., effect) corresponding to user setting (an effect is described hereinabove, for example) is reflected on the preview image. Further, the display unit 130 may display a progress situation with respect to a task of the image conversion progressed as a background through a given item (e.g., icon, status bar, text). An example of a picture of the display unit 130 operated by the present invention will be described later.

The display unit 130 may include at least one of a liquid crystal display (LCD), a thin film transistor-liquid crystal display (TFT LCD), an organic light-emitting diode (OLED), an Active Matrix OLED (AMOLED), a flexible display, and a 3D display. Some of the foregoing displays may be implemented by a transparent display configured by a transparent type or an optical transparent type.

According to the present invention, when the display unit 130 and a touch panel detecting a touch operation have a mutual layered structure (hereinafter referred to as 'touch screen'), the display unit 130 may be used as an input device in addition to an output device. The touch panel can convert variation in pressure applied to a specific region of the display unit 130 or capacitance generated at a specific region of the display unit 130 into an electric input signal. The touch panel may detect pressure when touching as well as touched location and area. When there is a touch input with respect to the touch panel, corresponding signal(s) is sent to a touch controller (not shown). The touch controller processes the signal (s) and transmits corresponding data to the controller 180. Accordingly, the controller 180 may recognize which region of the display unit 130 is touched. In addition, the display unit can be able to detected "contactless touch, wherein, for example, a finger or stylus comes within a certain predetermined distance without physically contacting the screen. However, the finger or stylus is sufficiently close to cause the display unit to consider an area of the display being touched. Although there are many variations of such a predetermined distance, one such non-limiting example is 1 mm.

The audio processor 140 transmits an audio signal received from the controller 180 to a speaker SPK, and transfers an audio signal such as a voice received from the microphone MIC to the controller 180. The audio processor 140 contains hardware such as circuitry, which may or may not reside in an integrated circuit to convert voice/sound data into an audible sound through the speaker SPK and outputs the audible sound under control of the controller 180. The audio processor 140 may convert an audio signal such as a voice received from the microphone MIC into a digital signal and transfer the digital signal to the controller 180 under the control of the controller 180.

The speaker SPK may output audio data received from the RF communication unit 110 or stored in the memory 150 in a call mode, a record mode, an audio recognition mode, and a broadcasting receiving mode. The speaker SPK may output a sound signal associated with functions (e.g., reception of call connection, sending the call connection, reception of a message, playback of a music file) performed by the portable device.

The microphone MIC receives and processes an external sound signal as electric audio data in a call mode, a record mode, and an audio recognition mode. In a case of the call mode, the processed audio data may be converted into a format which may be transmitted to a mobile communication base station through the communication module 111. Various noise removal algorithms for removing a noise generated during a procedure of receiving an external sound signal in the microphone MIC may be implemented by the audio processor or as part of another processor.

The memory 150, which comprises non-transitory machine readable medium, can store machine executable code, such as, for example, a program for processing and controlling the controller 180. The memory 150 may perform a function for temporarily storing input/output data (e.g., phone numbers (contact point information), messages, audios, still images, electronic books, moving images, contact). The memory 150 may store a used frequency (e.g., used frequency of application, used frequency of phone number, message, and multimedia, and used frequency of a community service), importance, and priority. The memory 150 may store data about vibration and sound having various patterns output when a touch is input on a touch screen. The memory 150 may store data (e.g., still image or moving image) shot in a shooting mode and various shooting options for various post-processing effects. The shooting option can be implemented, for example, in a plug-in form which is downloaded and additionally installed through the RF communication unit 110. Further, the memory 150 may store a first image obtained by converting a display image according to a shooting option and a second image obtained by converting the display image according to the shooting option. In this case, the memory 150 may store only the second image or simultaneously store the first and second images according to user setting.

The memory 150 comprises a storage medium having at least one type of a flash memory type, a hard disk type, a multimedia card micro type, a card type of a memory (for example, an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc. The portable device may operate associated with a web storage performing a storage function of the memory 150.

The interface unit 160 serves as a router with all external devices connected to the portable device. The interface unit 160 receives data or power from the external device and transfers the received data or power to respective constituent elements inside the portable device. The interface unit 160 makes it possible to transmit data from inside the portable device to the external device (not shown in FIG. 1). For example, the interface unit 160 may include a wired/wireless headset port, an external charger port, a wired/wireless data port, a memory card port, and a port connecting a device including an identification module, an audio input/output port, a video input/output port, and an earphone port.

The camera module 170 supports a shooting function of the portable device. In other words, the camera module 170 can shoot a still image and a moving image of a subject. The camera module 170 can shoot a predetermined subject and transfer the shot image data to the display unit 130 and the controller 180 under control of the controller 180. For example, the camera module 170 can include hardware such as an image sensor (or camera sensor) converting an input optical signal into an electric signal, and an image signal processor converting the electric signal received from the image sensor into digital image data. The image sensor may include a sensor using a Charge-coupled Device (CCD) scheme or Complementary Metal-Oxide-Semiconductor (CMOS) scheme. In particular, the camera module 170 may support an image processing function capable of minimizing a delay time from detection of an image to capture thereof upon shooting where various shooting options (effects) are set. In other words, the camera module can support a function for minimizing a delay time due to image processing in a photograph shooting scheme experiencing an image shot in a new form through an image post-processing correction such as image synthesis or various filter processing. An example of a configuration and an operation of the camera module 170 according to the present invention will be described.

The controller 180 controls an overall operation of the portable device. For example, the controller 180 may perform control associated with an audio call, data communication, and an image call. Further, the controller 180 may perform control associated with a shooting function and processing the shot image (e.g., background post-processing compensation). The controller 180 may include a post-processing compensation module 185 for background post-processing compensation of the shot image. Further, the controller 180 may include a multi-media module (not shown) for playing multi-media. In the present invention, the post-processing compensation module 185 and a multi-media module (not shown) may be configured inside or separately from the controller 180. The controller comprises hardware such as a microprocessor or processor that can be part of an integrated circuit, for example.

According to this exemplary embodiment of the present invention, the controller 180 controls an overall operation associated with shooting and image processing using the camera module according to the exemplary embodiment of the present invention. In particular, the controller 180 may control an overall operation associated with a post-processing operation of image compensation for applying shooting option in an image shooting scheme where a shooting option is set in a shooting mode. The controller 180 may separate the display image from an image having full resolution (still image) to process the images in parallel (independently). The controller 180 is configured to control a camera module 170 to process the displayed image in a preview mode. The controller 180 controls the camera module 170 to simultaneously, (e.g. meaning substantially simultaneously, either at the same time, or within a given overlapping time period) process preview display according to the displayed image and process a background of image conversion such as post-processing compensation with respect to an image having full resolution.

If a shooting command based on a shooting option is received while displaying a preview of the display image by executing at least one program stored in the memory 150. The controller 180 processes image compensation applying the shooting option to the image having a full resolution, and also perform an operation associated with entering a preview mode to process preview display based on a display image of a next frame, that is, processing by image compensation in parallel. The at least one program may include commands for executing an operation associated with converting an image acquired from the camera module into a displayed image and an image having a full resolution (still image), and buffering the converted displayed image and an image having a full resolution, displaying the buffered displayed image as a preview image, displaying an effect preview image obtained by applying the shooting option to the display image when an input setting the shooting option is received while displaying the displayed image as a preview, processing image compensation applying the shooting option to the image having full resolution as a background when an input of a shutter button is received, and entering the preview mode to process the preview display based on display image of a next frame while processing image compensation applying the shooting option to the image having full resolution as a background when an input of a shutter button is received. A detail control operation of the controller 180 will be described in an example of an operation of the portable device and a control method thereof with reference to following drawings.

The power supply 190 uses power which is applied from an external power source or an internal power source thereto and supplies power necessary to operate each constituent element to each constituent element, under control of the controller 180. We note that the power supply for an electronic device can merely constitute a detachable power cord that may or may not include conversion circuitry that delivers a certain desired level of energy. Also, Applicant's appended claims do not recite a battery, and the power supply can constitute hardware that attaches to a power source.

Meanwhile, various exemplary embodiments according to the present invention may be implemented in a medium readable medium storing machine executable code thereon which may be loaded into a computer, processor, microprocessor for execution. According to hardware implementation, various exemplary embodiments of the present invention may be implemented using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for executing the functions, just to name some non-limiting possibilities. In some cases, variation exemplary embodiments may be implemented by the controller 180. According to the software implementation, embodiments of procedures and functions according to the specification may be implemented by separate software modules comprised of machine executable code that are loaded into hardware for functionality, as the invention does not constitute non-statutory software per se. The software modules when loaded into hardware and executed can perform at least one function and operation described in the specification.

Further, the portable device of the present invention illustrated in FIG. 1 may include various devices such as various information and communication devices, multi-media devices, and application devices thereof supporting functions of the present invention using an Application Processor (AP), a Graphic Processing Unit (GPU), and a Central Processing Unit (CPU). For example the portable device includes devices such as tablet Personal Computer (PC), phablet, Smart Phone, digital camera, Portable Multimedia Player (PMP), media player, portable game device, laptop computer, Personal Digital Assistant (PDA) as well as mobile communication devices operating based on respective communication protocols corresponding to various communication systems.

Figure 2:
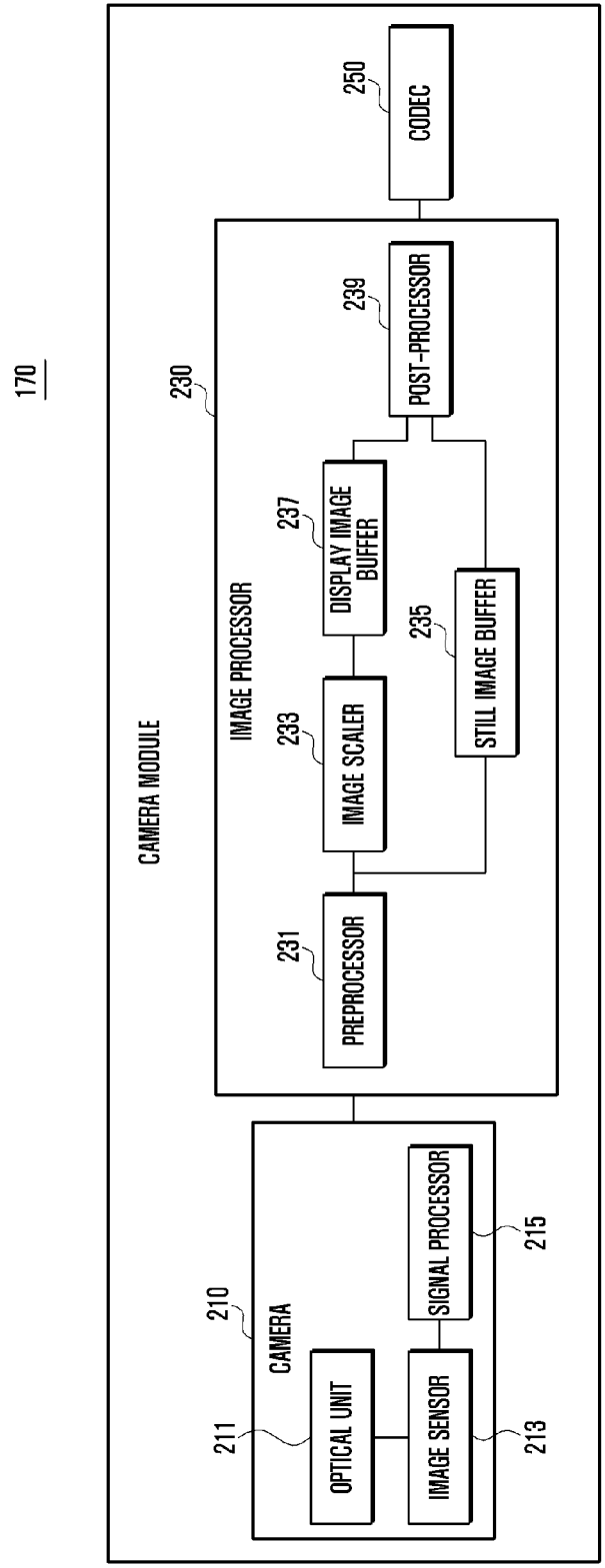
FIG. 2 is a block diagram schematically illustrating a configuration of a camera module according to an exemplary embodiment of the present invention.

FIG. 2 is a block diagram schematically illustrating exemplary configuration of a camera module 170 according to an exemplary embodiment of the present invention.

Referring now to FIG. 2, the camera module 170 includes a camera 210, an image processor 230, and a CODEC 250.

A camera module 170 having more or less elements of FIGS. 1 and 2 of the present invention may be implemented.

When driving the camera module 170 by the controller 180, that is, when activating a shooting function, the camera 210 acquires an image through an internal sensor. The camera 210 can include, for example an optical unit 211, an image sensor 213, and a signal processor 215.

With continued reference to FIG. 2, the optical unit 211 operates by a meca-shutter, a motor, and an actuator, and may operate zooming and focusing operations by an actuator. The optical unit 211 provides a peripheral image, and the image sensor 213 detects the image provided from the optical unit 211, and converts the image into an electric signal. The image sensor 231 may be an image sensor having high resolution, such as a CMOS sensor or a CCD sensor. In an exemplary embodiment of the present invention, the image sensor 231 can be a sensor that detects an image greater than an Ultra High Definition (UHD) grade. The image sensor 213 may include a global shutter therein. The image detected from the image sensor 213 is converted into a digital image through the signal processor 215, and the digital image is output.

The signal processor 215 may comprise an Image Signal Processor (ISP). The camera 210 may include a viewfinder. The image processor 230 converts an image generated from the camera 210 into a display image and processes the display image. Further, when a shooting option is added, the image processor 230 may process image conversion using a display image and image conversion using a still image. The image processor 230 may include a preprocessor 231, an image scaler 233, a still image buffer 235, a display image buffer 237, and a post-processor 239.

The preprocessor 231 performs a function of preprocessing an image acquired from the camera 210. For example, the preprocessing function may include 3A (AWB (Auto White Balance, AE (Auto Exposure), AF (Auto Focusing)) extraction and processing function, lens shading correction, dead pixel correction, and knee correction function.

The image scaler 233 adjusts (scales) an image having full resolution of the camera 210 output from the preprocessor 231 to a size for being displayed on the display unit 130. For example, the image scaling may be implemented by at least one of various schemes such as resize, decimation, interpolation, crop, addition, and averaging. The image scaler 233 may include a resizer and/or a summing average unit, both of which comprises hardware for operation such as a processor, sub-processor, and/or associated circuitry therewith.

When the image scaler 233 is implemented by the resizer (not shown), the resizer resizes an image having a high resolution output from the pre-processor to the capacity and the size of an image to be displayed on the display unit 130. In this case, as illustrated above, the resizing can perform an operation such as decimation, interpolation, and crop suitably for aspect ratio of the display unit 130, and can operate under control of the control unit 180.

When the image scaler 233 is implemented by the summing average, the summing average unit (not shown) is configured to add and average adjacent pixels of an image to reduce the pixel number of images. The summing average unit averages adjacent pixels of an image having full resolution output from the pre-processor 231 to reduce the pixel number of a display image.

The still image buffer 235 provides machine readable storage to buffer an image having high resolution of the camera 210 output from the preprocessor 231. The still image buffer 235 may be set to a size having a capacity sufficient to store a frame image having high resolution. The still image buffer 235 buffers an image having a full resolution output from the pre-processor 231 for each frame. When an image capture is requested, an image selected under control of the controller 180 may be accessed.

The display image buffer 237 may buffer a scaled image output from the image scaler 233. The display image buffer 237 may compensate for a time for displaying and processing the display image on the display unit 130.

A display image and/or still image output from the display image buffer 237 and/or the still image buffer 235 are input to the post-processor 239. The post-processor 239 performs post-processing such as color interpolation, noise rejection, and color correction, and generates YUV data by image conversion processing the post-processed image. More particularly, the post-processor 239 post-processes color interpolation with respect to the preprocessed image, and the post-processed image into a YUV image. The post-processor 239 may include a color interpolator, an Image Processing Chain (IPC), and an image converter.

The color interpolator performs color interpolation function converting an input image into a color image. For example, the color interpolator may convert pixels of an image output from the camera 210 into a color including three colors RGB (full color conversion). The color interpolator performs color interpolation using correlation between adjacent pixels. In general, within the image processor 230, the image processing before color interpolation may be referred to as preprocessing and image processing after color interpolation may be referred to as post-processing.

The IPC of the post processor 239 can also perform noise reduction, gamma correction, and luminance correction of an image color-interpolated through the color interpolator.

The image converter converts the post-processed image into a YUV image.

The post-processor 239 can output an image that is displayed by the display unit 130 in a preview mode. The post-processor 239 classifies the image of the post-processor 239 into a display image and a still image in a capture mode, outputs the display image on the display unit 130, post-processing compensates the image having full resolution by background, and outputs the image in the memory 150 through the CODEC 250. The function of the post-processor 239 can be configured in a software scheme that is loaded into hardware for execution.

In a method of configuring a function of the post-processor 239, the controller 180 controls the display image buffer 237 and the still image buffer 250 during every frame section to select an image applied to the post-processor 239, and controls an image output from the post-processor 239 to classify the image into a display image and a still image. The controller 180 restores the classified display image to a preview mode and controls the display unit 130 to output the display image, and process image compensation with respect to the classified still image as a background to completion of the image compensation. The background based post-processing compensation function may be stored or loaded in at least one of the memory 150 and executed by the controller 180 or a separate processor (not shown). The background based post-processing compensation function may be implemented by a separate image compensation application for background based post-processing separately from a basic shooting application performing a shooting function (particularly, preview mode, display and shooting of a preview image in the preview mode). In this case, the shooting application and the image compensation application process an image in parallel. If the shooting application is terminated and post-processing compensation has not terminated, the image compensation application may continuously perform a task regardless of termination of the shooting application until the post-processing compensation has terminated. The task of image compensation\may be operated during a preset period according to the user setting, or manually terminated, or executed according to user selection.

The operation during the preset period may be set in various units of a particular period (e.g., night of a predetermined time interval (e.g., time interval when the user sleeps)), units of time, units of weeks, units of week, and unit of months.

The CODEC 250 contains or configures hardware for compression-coding a still image output from the image processor 230 and storing coded still image in the memory 150. The codec 250 may comprise a JPEG codec.

An operation of a portable device having a construction as described above will be described.

The controller 180 controls an operation of a camera module 170 according to a control command input through the user input unit 120. In other words, when a driving command of the camera module 170 is generated, the user controls the camera 210 and the image processor 230 to perform an operation in a preview mode.

In more detail, the controller 180 drives the camera 210 according to the driving command, and an image output from the camera 210 is input to the pre-processor 231. The pre-processor 231 generates a frame image for each frame period (frame rate) under control of the controller 180. The frame period may have 30 fps (frame per sec) or greater (e.g., 60 fps). The pre-processor 231 extracts and processes 3A (AWB, AE, AF) from the frame image, and performs lens shading compensation, dead pixel and knee compensation. As illustrated above, the pre-processed image is an image having full resolution, which is applied to the image scaler 233 and the still image buffer 235.

The image scaler 233 scales the input image having full resolution to a size to be displayed on the display unit 130. The image scaling may be achieved by reducing the number of pixels of the image having full resolution to scale the image to a suitable size to be displayed on the display unit 130, and can be achieved by scaling the image having full resolution suited to an aspect ratio. The image scaling may be achieved in various ratios.

As illustrated above, the scaled image is applied to the display image buffer 237 so that the scaled image can be buffered by the display image buffer 237. The display image buffer 237 may adjust a processing time of the display image. In other words, the display image buffer 237 may buffer a display image of a next frame in a capture mode until processing of the still image is terminated.

Further, the still image buffer 235 buffers an image having full resolution output from the pre-processor 231. In this case, the still image buffer 235 may have a ring buffer configuration, and may buffer the preset number of frame images. In other words, the still image buffer 235 may "N" (N is an integer other than 1) ring buffer configurations capable of image data of N frames, and may buffer frame image data output from the pre-processor 231 for each frame. For example, frame image data generated for each frame are buffered from a first buffer of the still image buffer 235. If the frame image data are buffered to a final buffer, the controller 180 again overwrites frame image data output from the pre-processor 231 in the first buffer.

Accordingly, an image acquired from the camera 210 for each frame is buffered in the display image buffer 237 as a display image, and then is buffered in the still image buffer 235 as a still image. Accordingly, the controller 180 applies images of the display image buffer 237 and/or the still image buffer 235 to the post-processor 239.

First, an operation of a preview mode is schematically described.

As described above, an image shot for each frame from the camera 210 may be scaled to an image having full resolution can be generated as a display image by scaling the pre-processed image having full resolution. Further, the display image buffer 237 buffers the scaled display image, and the still image buffer 235 buffers the pre-processed image having full resolution. The controller 180 can also control transfer of the display image buffered in the image buffer 237 to the post-processor 239. Accordingly, the post-processor 239 performs color interpolation, IP processing, and image conversion to output a display image (e.g., YUV). The controller 180 accesses the display image to control the display unit 130 (or the display unit 130 and the memory 150) to output the display image. When a shooting option is set in a preview mode, image conversion is achieved based on the display image of the display image buffer 237, and the controller 180 controls the display unit 130 to output the converted display image (effect preview image).

Hereinafter, an operation of a capture mode will be schematically described.

If the user request still image shooting (capture) through, for example, the user input unit 120 in the preview mode as described above, the controller 180 selects an image having full resolution (still image) buffered in the still image buffer 235.

In this case, when a review mode is set upon processing the capture mode, the controller 180 selects a display image stored in the display image buffer 237 to apply the selected display image to the post-processor 239, and processes to provide an effect preview image obtained by post-processing compensation (that is, applying an effect according to a shooting option) for a display image processed by the post-processor 239 to be displayed on the display unit 130.

If storage of the image displayed on the display unit 130 is requested in the review mode, the controller 180 selects an image having full resolution buffered in the still image buffer 235 and transfers the selected image to the post-processor 239. Further, the post-processor 239 processes an input still image. In this case, the still image may be an image having full resolution and/or may be the image acquired through the camera 210. Moreover, the controller 180 processes the still image as a background, and reads and processes the display image buffered in the display image buffer 237 to be displayed on the display unit 130 through the post-processor 239.

However, when the review mode is not set upon processing a capture mode, the controller 180 omits processing of the display image, progresses image conversion such as compensation with respect to the image having full resolution of the still image buffer 235 as a background, and reads and processes the display image of the display image buffer 237 in parallel to be displayed on the display unit 130 through the post-processor 239.

As illustrated above, according to the exemplary embodiment of the present invention, when a capture is requested through the user input unit 120, the controller 180 may perform preview mode processing and image compensation in parallel. Further, the controller 180 displays the display image on the display unit 130, and selects an image having full resolution when the capture is requested from the still image buffer 235 to process the post-processing compensation as the background. Next, when the image compensation is completed, the controller 180 codes the image having full resolution processed as the background and controls the memory 150 to store the coded image.

For example, the controller 180 controls the image processor 230 to temporarily store a display image in the display image buffer 237, and to temporarily store an image having full resolution in the still image buffer 235. Further, the controller 180 may control the image processor 230 to output a display image of the display image buffer 237 on the display unit 130 in a preview mode. In addition, the controller 180 controls the image processor 230 to output the display image of the display image buffer 237 on the display unit 130 in a capture mode. The controller 180 processes post-processing image compensation with respect to the image having full resolution as a background and stores the processed image in the memory 150.

Moreover, the controller 180 may selectively store the effect preview image. For example, the controller 180 may capture and store an effect preview image with compensation for the image having full resolution according to the user setting or store the captured effect preview image according to a review mode.

As illustrated above, the portable device according to the exemplary embodiment of the present invention may remove a user waiting operation until an image acquired from the camera 210 is detected and captured, that is, until a next shooting is possible after a shutter button is input by processing conversion for the image having full resolution for compensating a post-processing image as a background and simultaneously returning to the preview mode. Accordingly, even in a shooting scheme requiring a delay time such as various shooting options or an image having high resolution, the user may directly perform next shooting without having a substantial waiting time.

Figure 3:
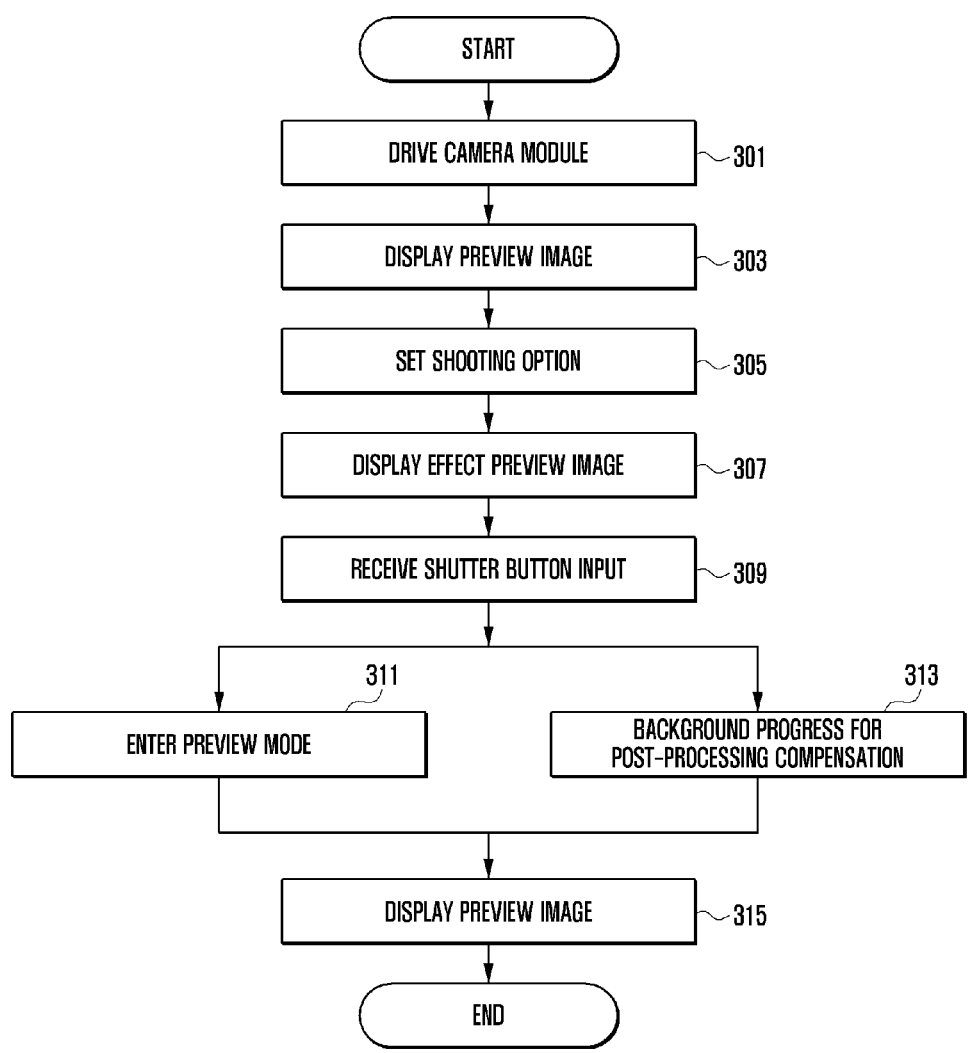
FIG. 3 is a flowchart illustrating exemplary operation of a method of processing a shot image in the portable device according to an exemplary embodiment of the present invention.

FIG. 3 is a flowchart illustrating exemplary operation of a method of processing a shot image in the portable device according to an exemplary embodiment of the present invention.

Referring now to FIG. 3, if a drive command of a camera module 170 is generated through a user input unit 120 or a display unit 130 having an input function, at (301) a controller 180 may drive the camera module 170.

At (303), the controller can control a preview mode where an image acquired through the camera module 170 and a preview image is displayed on the display unit 130.

The controller 180 may output a display image of the display image buffer 237 to the display unit 130 so that the preview image is displayed, and may buffer a still image having a full resolution through the still image buffer 235.

At (305), the controller 180 may set a shooting option according to user selection while displaying the preview image (from (303) in the preview mode. For example, If the shooting option is requested according to user input while displaying the preview image, the controller 180 may provide various options (effects) capable of setting a pop-up (e.g., shooting option menu) on the preview image, and may set an option selected from the pop-up (e.g., shooting option menu) by the user as the shooting option.

At (307), if the setting of the shooting option is terminated (completed), the controller 180 may display of the effect preview image. For example, the controller 180 may display the effect preview image where an effect corresponding to a shooting option of user setting is processed (image conversion) to a display image acquired through the display image buffer 237. The display image may have a size smaller than the still image having full resolution, and may have the size corresponding to the size of the display unit 130. Accordingly, the effect preview image may have a size corresponding to the size of the display image.

At (309), the controller 180 can receive a shutter button input from the user while displaying the effect preview image. For example, the user can input a shutter button commanding shooting through the user input unit 120 or the display unit 130 having an input function.

When receiving the shutter button input at (309), the controller 180 can enter the preview mode (311) and at (315) can display the preview image. In parallel with (311 and 315), at (313) the controller 180 can perform background progress for post-processing compensation corresponding to the effect preview image simultaneously with processing for displaying the preview image in parallel.

For example, if a shutter button input signal is received, the controller 180 returns to the preview mode and may display an image acquired through the display image buffer 237 as a preview image. Further, the controller 180 may perform image conversion of a shooting option according to a user setting as a background separately from an operation for the preview mode in parallel. In this case, the controller 180 may acquire an image having a high resolution (still image) being buffered in the still image buffer 235 when a shutter button is input, and progress image conversion applying the shooting option to the still image as a background. In other words, the controller 180 acquires an image from the camera module 170 for each frame period, converts the acquired image into a display image for preview to display the converted image on the display unit 130, and performs processing for applying a shooting option to the image having high resolution acquired from the camera module 170 as the background.

FIGS. 4, 5, 6, 7 8 and 9 are diagrams examples of an operation of shooting a subject using the portable device according to an exemplary embodiment of the present invention.

Referring now to FIGS. 4 to 9, FIG. 4 illustrates a picture of the portable device when the portable device displays an image as a preview. For example, if a drive command of the camera module 170 is generated according to a control command input from the user, the camera 210 and the image processor 230 are controlled so that a picture of a state that an operation of the preview mode is performed may be provided.

Figure 4:
FIG. 4 shows an input of a selection event selecting a preset item (or icon) for setting shooting option on a picture on which the preview image is displayed.

When the user may input a selection event selecting a preset item (or icon) 400 for setting a shooting option on a picture on which the preview image is displayed as shown in FIG. 4. For example, the user may command call of a shooting option menu 500 by selecting (touching or near-touch) a preset item (or icon) 400 instructing option setting on a picture on which the preview image is displayed.

Figure 5:
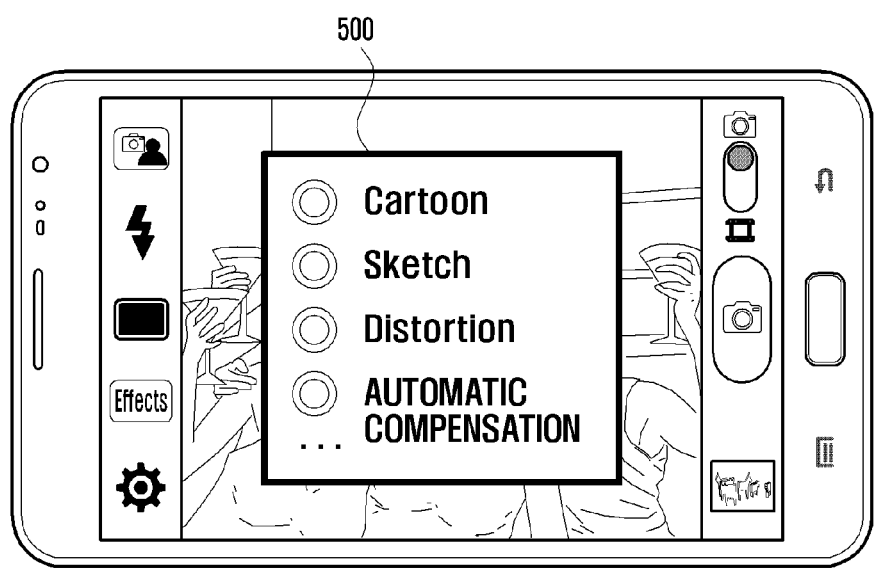
FIG. 5 illustrates an example of a picture in a state that the shooting option menu capable of selecting various shooting options on a picture on which the preview image of a portable device is displayed.

Accordingly, if the selection event (touch or near-touch) is input to the preset item 400, the portable device may display a shooting option menu 500 for setting a shooting option as shown in FIG. 5. In other words, FIG. 5 illustrates an example of a picture in a state that the shooting option menu 500 capable of selecting various shooting options on a picture on which the preview image of a portable device is displayed.

According to the present invention, the user may selectively set various shooting options such as an effect option including sketch, shade, distortion, synthesis, animation, vignetting, vintage, color conversion, and luminescence; and an effect option such as composition for improving image quality, a background capable of changing a background of a subject, and panorama capable of shooting a wide viewing angle. The shooting option as described above may be implemented in a plug-in form and may be added or removed according to user selection. Further, a function menu for accessing the server capable of downloading a shooting option through the shooting option menu 500, and the user may communicate with a server for downloading the shooting option even in a shooting mode according to selection of the function menu.

Figure 6:
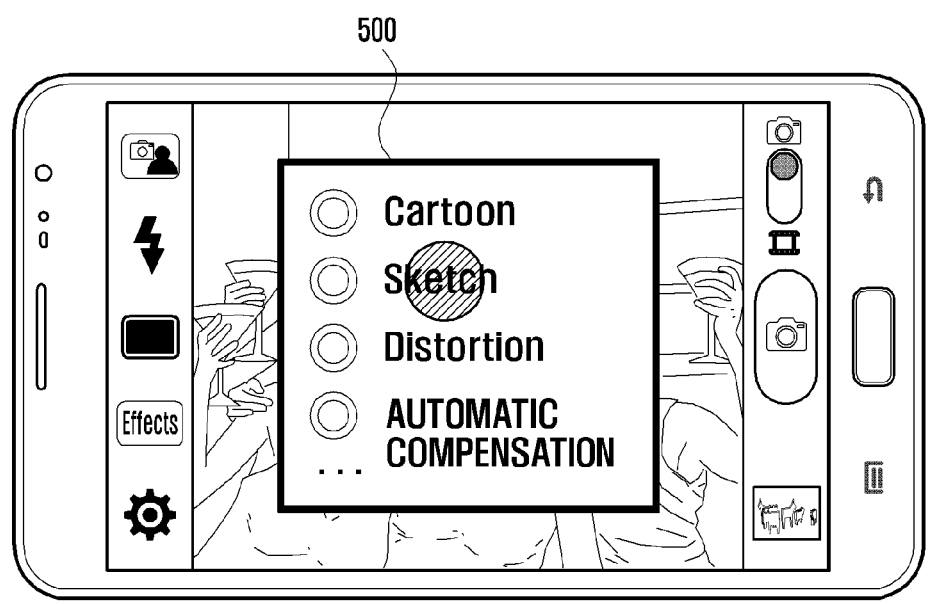
FIG. 6 illustrates the user inputting a selection event (touch) selecting a sketch from various shooting options provided through the shooting option menu.

Meanwhile, the user may input a selection event selecting an option item to be set as shown in FIG. 6 from a picture on which the shooting option menu 500 is displayed as shown in FIG. 5. For example, the user may input a selection event (touch) selecting a sketch from various shooting options provided through the shooting option menu 500 as shown in FIG. 6. The user may select an option item to be set to terminate option setting. If a selection event input selecting an option from the shooting option menu 500 from the user is detected, the portable device may automatically terminate the option setting.

Figure 7:
FIG. 7 illustrates the picture of FIG. 6 converted according to a selection event input.

If the shooting option setting is terminated (completed), the portable device can display a picture as illustrated in FIG. 7. That is, the picture of the portable device illustrated in FIG. 6 is converted as illustrated in FIG. 7 according to a selection event input.

As illustrated above, if an option item (e.g., sketch) is selected from a shooting option setting picture according to a user input, the portable device displays an effect preview image where an option (or effect) according to user selection to the preview image. For example, as illustrated above, a picture of a portable device where a display image is displayed as a preview is converted into a picture on which a converted effect preview image is displayed as a preview corresponding to an option of an option item selected by the user in FIG. 6.

The user can select (by touch or near-touch) a shutter button for shooting (capture) in a state that the effect preview image is displayed as the preview. If an input is made using the shutter button, the portable device may display a picture as illustrated in FIG. 8 or FIG. 9 according to a set state (activation or inactivation) of a review mode or a quick view mode.

Figure 8:
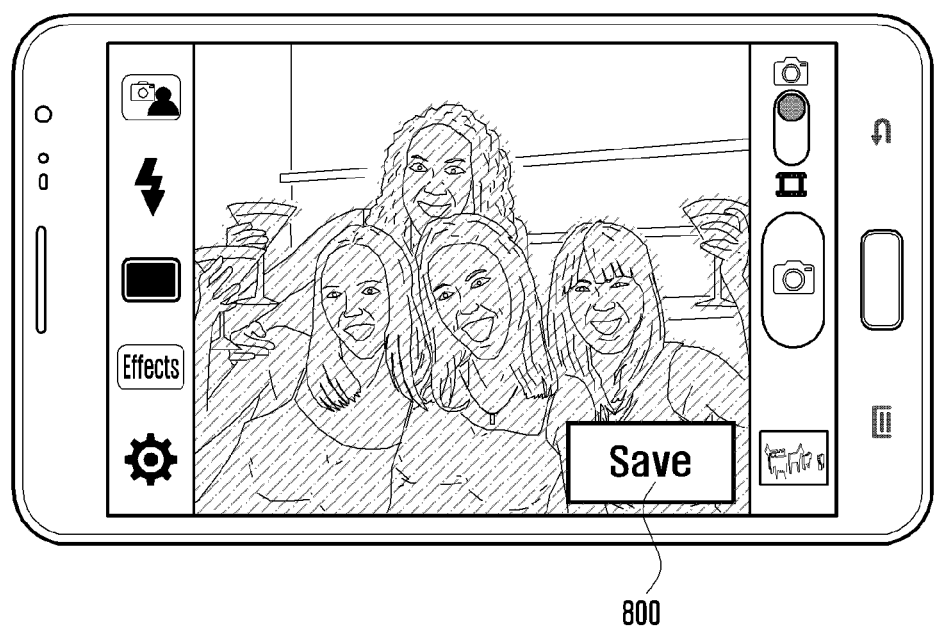
FIG. 8 displays a picture according to a set state (activation or inactivation) of a review mode or a quick view mode.

For example, when the review mode is set to activation, the screen illustrated in FIG. 7 is converted as illustrated in FIG. 8. As shown in FIG. 8, the portable device may capture an effect preview image as illustrated in FIG. 7, display the captured image, and display a storage item (or icon, menu) 800 capable of determining whether the captured image is stored on one region of the capture image picture. In other words, FIG. 8 illustrates an example of a picture in a state that a capture image where a shooting option (e.g., sketch) is applied to a display image of the display image buffer 237 is displayed.

The user may confirm a preview of a capture image as shown in FIG. 8 to determine whether the capture image is stored. When it is determined that the capture image is stored, the user may input (touch) selecting the storage item 800. When cancel of the capture image is determined, the user may input an event (touch) selecting a cancel button (not shown) provided in the portable device.

Figure 9:
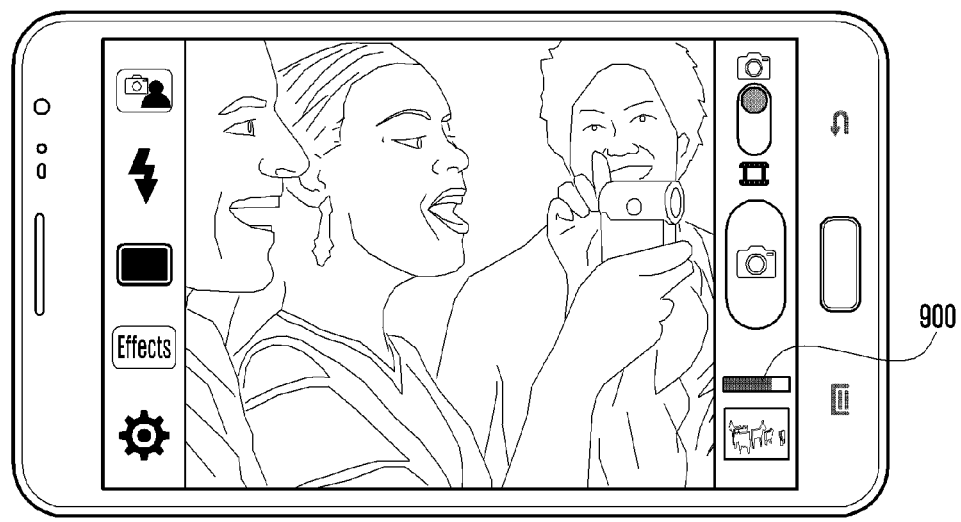
FIG. 9 illustrates an example of a picture on the portable device when the portable device displays a new image as a preview according to an exemplary embodiment of the present invention.

When the user selects storage of the capture image in a state of FIG. 8 or a review mode is set to inactivation in a state of FIG. 7 (that is, when a quick view mode is set to activation), as shown in FIG. 9, the portable device may return to a preview operation to display a picture on which a preview image is displayed in a preview mode. That is, FIG. 9 illustrates an example of a picture on the portable device when the portable device displays a new image as a preview.

For example, a picture shown in FIG. 7 or 9 is converted into a picture shown in FIG. 9 according to a shutter button input in a picture display state of FIG. 7 or a storage command input in a picture display state of FIG. 8. Further, if interaction (e.g., shutter button input or storage command input) is received according to a user input in FIG. 7 or 8, the portable device may process image conversion by applying a shooting option (e.g., sketch) to an image having full resolution of the still image buffer 235 as a background. Further, the portable device processes image compensation returns to a preview mode while processing compensation for an image having full resolution as a background, thereby displaying a display image acquired through camera module 170 as a preview image.

As shown in FIG. 9, a state item (e.g., icon, state bar 900, text, etc.) reporting a progress state according to the background processing may be provided to one region of a picture where a display image of the display image buffer 237 is displayed as a preview as shown in FIG. 9.

As described above, according to the present invention, when the review mode is set to activation, rapid display is possible through image compensation by applying an option (effect) according to selection of the user to a display image of a size corresponding to a preview having low resolution. When a storage command is input in a review mode or the review mode is set to inactivation, image compensation applying an option (effect) according to selection of the user to a still image having a size corresponding to full resolution (or resolution according to user setting) may progress as a background image in parallel while displaying a preview image according to switching of the preview mode. Accordingly, the user may directly request the next shooting without a delay time (e.g., shutter delay or shutter lag) for the next shooting.

Figure 10:
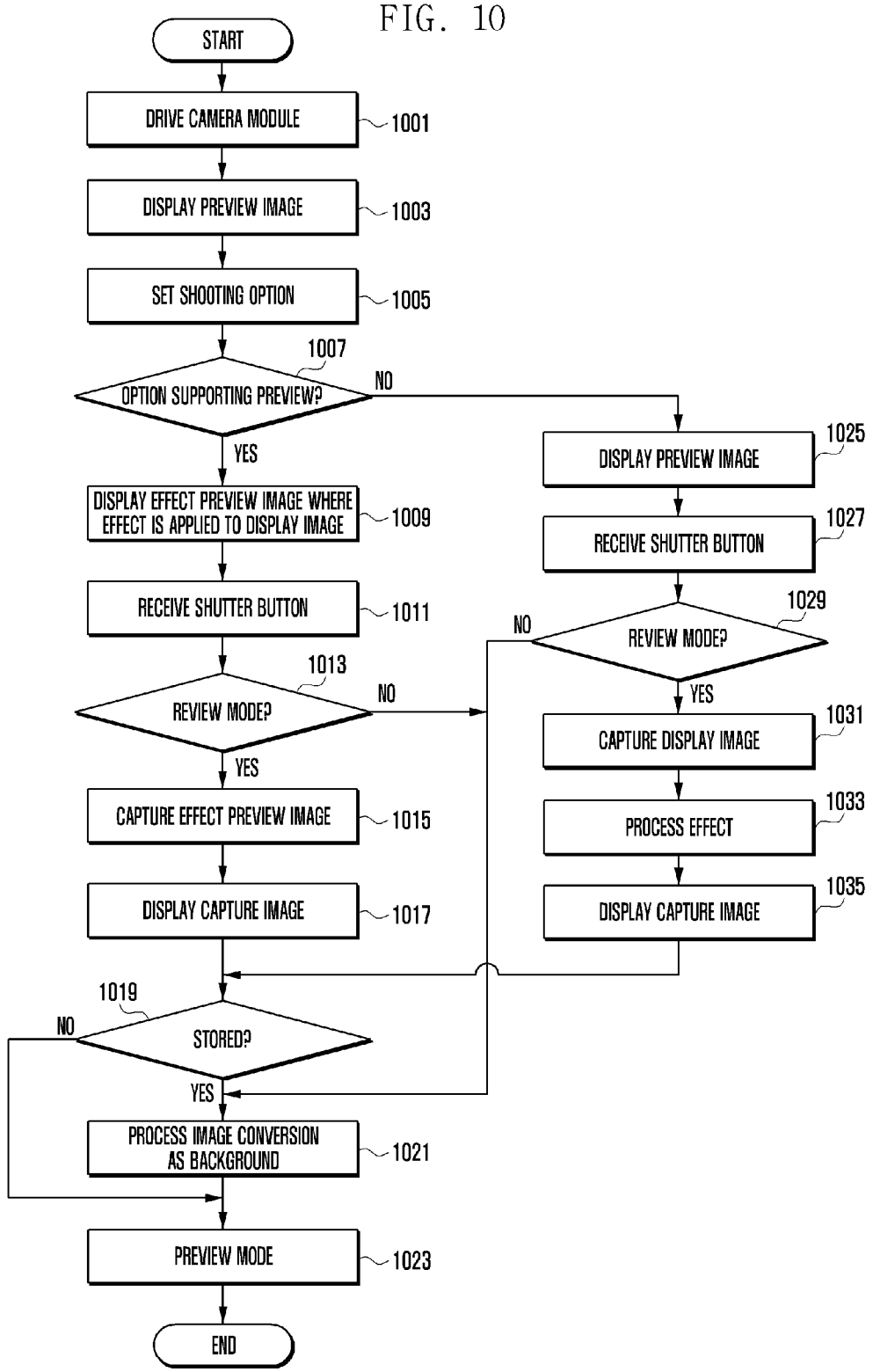
FIG. 10 is a flowchart illustrating exemplary operation of a method of processing the shot image in the portable device according to an exemplary embodiment of the present invention.

FIG. 10 is a flowchart illustrating exemplary operation of a method of processing the shot image in the portable device according to an exemplary embodiment of the present invention.

Referring now to FIG. 10, at (1001) if a drive command of a camera module 170 is generated through a user input unit 120 or a display unit 130 having an input function, a controller 180 can drive the camera module 170.

At (1003), the controller can control a preview mode where an image acquired through the camera module 170 and a preview image is displayed on the display unit 130. The controller 180 can output a display image of the display image buffer 237 to the display unit 130 so that the preview image is displayed, and may buffer a still image having full resolution through the still image buffer 235.

At (1005), the controller 180 sets a shooting option according to user selection while displaying a preview image in the preview mode. For example, if the shooting option is requested according to user input while displaying the preview image, the controller 180 can provide various options (effects) capable of setting a pop-up (e.g., shooting option menu) on the preview image, and may set an option selected from the pop-up (e.g., shooting option menu) by the user as the shooting option.

At (1007), if a shooting option is set according to user selection, the controller 180 determines whether or not a selected shooting option is an option supporting a preview. For example, the controller 180 can determine whether the selected shooting option is an option which is directly applied to a display image such as an effect including sketch to be displayed as a preview or an option which is not directly applied to the display image such as effect including distortion but is applied by post-processing compensation.

When at (1007), the selected shooting option is the option supporting the preview (YES at 1007), then at (1009) the controller 180 may display an effect preview image where an effect (e.g., sketch) according to the selected shooting option is applied to the display image on a picture as a preview. In other words, the controller 180 may display an effect preview image where an effect corresponding to a shooting option of user setting is processed (image conversion) to a display image acquired through the display image buffer 237. The display image may have a display size smaller than the still image having a full resolution, and can have a size corresponding to a display size of the display unit 130. Accordingly, the effect preview image may have the size corresponding to the display size of the display image.

At (1011), when a shutter button input is received from a user while displaying the effect preview image, then at (1013) the controller 180 may determine whether a review mode is set.

When at (1013) the review mode is not set (NO of step 1013), then at (1021) the controller 180 performs control of the processing the image conversion as a background. For example, the controller 180 can acquire an image having a full resolution (that is, still image) buffered in the still image buffer 235, and at (0121) process image conversion applying the shooting option to the still image as a background.

Further, at (1023) the controller 180 returns to a preview mode while processing a background with respect to the still image to progress a processing operation for displaying a display image of the display image buffer 237 in parallel in a preview mode. In other words, the controller 1023 returns to the preview mode at the shutter button input time to display a preview picture, and processes conversion with respect to the still image in parallel as a background.

At (1013) if the review mode is set (YES of step 1013), then at (1015) the controller 180 captures the effect preview image displayed on a picture.

At (1017) the controller controls the display of the captured image (1017). For example, when the shutter button input is received and the review mode is set, the controller 180 may acquire a display image of the display image buffer 237, and process image conversion applying a shooting option to the acquired display image to display the capture image on a picture.

At (1019) the controller 180 determines whether or not the capture image is stored after displaying the capture image. For example, the controller 180 may determine whether a command for storing the capture image is input through a storage item 800.

If at (1019) a storage command of the capture image is not generated, in other words, if a cancel command is generated (NO of step 1019), then at (1023) the controller 180 returns to the preview mode to control an operation for displaying a preview image.

If at (1019) the storage command of the capture image is generated (YES of step 1019), the controller 180 may acquire an image having a full resolution (that is, a still image) buffered in the still image buffer 235, and at (1021) may process image conversion applying the shooting option to the still image as a background.

Further, at (1023) the controller 180 may return to the preview mode while processing the background with respect to the still image to perform an operation for displaying the display image of the display image buffer 237 as a preview. In other words, the controller 1023 can return to the preview mode and convert a picture on which the effect preview image is displayed into a preview picture to display a preview image, and may perform image conversion with respect to the still image as a background in parallel.

When at (1007), the selected shooting option is not the option supporting a preview (NO of step 1007), then at (1025) the controller 180 may display a preview image on a picture. In other words, the controller 180 may display a display image acquired through the display image buffer 237.

At (1027) when a shutter button input is received from a user while displaying the effect preview image, then at (1029) the controller 180 can determine whether a review mode is set.

If at (1029) the review mode is not set (NO of step 1029), the controller 180 returns to the preview mode to process preview display, acquires an image having full resolution (that is, still image) buffered in the still image buffer 235 as a background to perform image conversion such as image compensation corresponding to a shooting option.

When at (1029) the review mode is set (YES of step 1029), the controller 180 can at (1031) capture a display image buffered in the display image buffer 237, and at (1033) process an effect according to the shooting option in the display image. At (1035), the controller 180 can control display of the capture image. Next, the controller can perform step 1019 as illustrated above and control the foregoing procedures.

Figure 11:
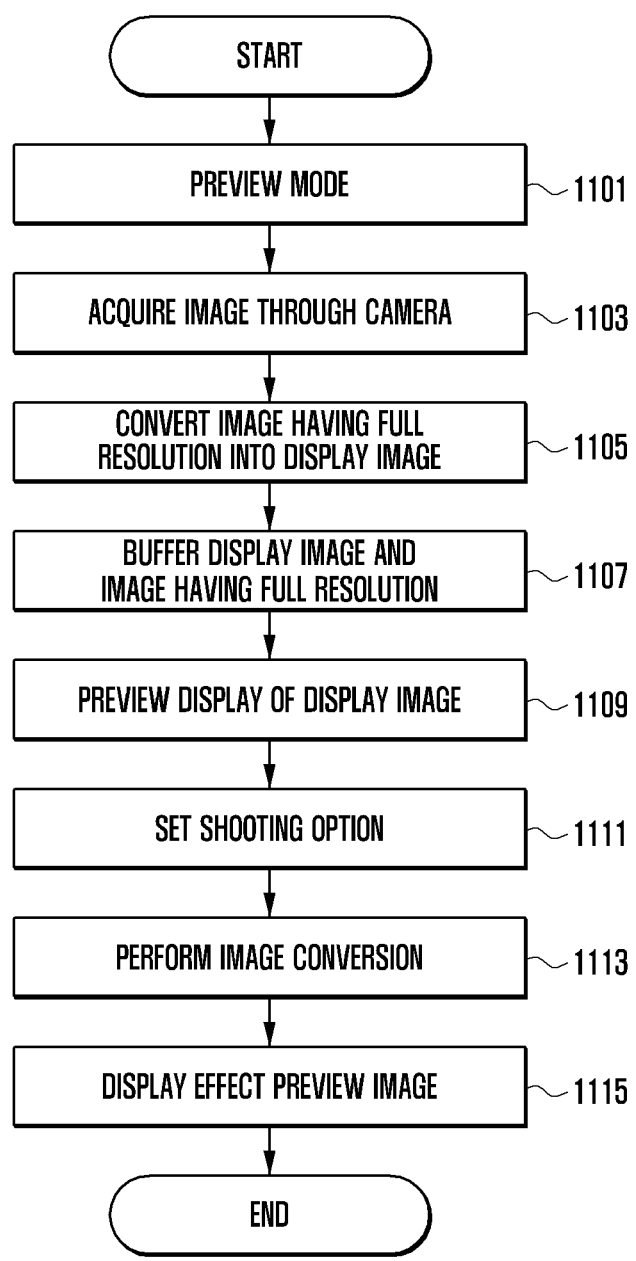
FIG. 11 is a flowchart illustrating an exemplary operation for displaying an effect preview image during procedure of processing the shot image in the portable device according to an exemplary embodiment of the present invention.

FIG. 11 is a flowchart illustrating an exemplary operation for displaying an effect preview image during procedure of processing the shot image in the portable device according to an exemplary embodiment of the present invention. Particularly, FIG. 11 is a flowchart illustrating an exemplary method for displaying an effect preview image as illustrated above.

Referring now to FIG. 11, at (1101) when entering a preview mode, for example, when a drive command of a camera module 170 is generated according to a user input, a controller 180 can control a camera 210 and an image processor 230 of the camera module 170 to control an operation of the preview mode.

In particular, the controller 180 can drive the camera 210 according to the drive command, and at (1103) can acquire an image through the camera 210.

Further, at (1105), the controller 180 converts an image having full resolution output from the camera 210 into a display image. For example, the controller 180 can convert the image having full resolution output from the camera 210 into a display image having a size to be displayed on a display unit 130 through an image scaler 233.

At (1107), the controller 180 may buffer the display image converted (scaled) from the image having full resolution through a display image buffer 237, and may buffer the image having full resolution through the still image buffer 235. In other words, the image acquired for each frame from the camera 120 may be buffered in the display image buffer 237 as a display image, and may be buffered in the still image buffer 235 as a still image.

At (1109), the controller 180 controls a preview display of a display image buffered in the display image buffer 237. For example, the controller 180 can transfer the display image buffered in the display image buffer 237 to a post-processor 239, and perform color interpolation, IP processing, and image conversion with respect to the display image to output a display image through the post-processor 239. Then, the controller 180 accesses the display image to control the display unit 130 to output the display image.

At (1111), if a preset command for setting a shooting option is generated while displaying a preview of a display image as described above, then at (1113) the controller 180 may perform image conversion based on an effect of an option where setting is requested. For example, the controller 180 may perform image conversion applying an effect (e.g., sketch, vintage, shading, etc.) to the display image acquired from the display image buffer 237.

At (1115), if the image conversion processing is terminated, the controller 180 may control display of an effect preview image. In other words, the controller 180 may display an effect preview image where an effect corresponding to a shooting option of user setting is processed in the display image acquired through the display image buffer 237. The display image may have a display size smaller than that of the still image having full resolution, and may have the size corresponding to the display size of the display unit 130. Accordingly, the preview image may have the size corresponding to the display size of the display image.

As illustrated above, according to the exemplary embodiment of the present invention, when processing an effect preview image based on a shooting option, conversion with respect to a display image reduced to a level corresponding to display resolution of the display unit 130 rather than an image having full resolution is processed.

The converted effect preview image is viewed by the user as a preview. According to a set state of a review mode upon a shutter button input of the user, a display operation of a capture display where the effect preview image is captured, and an operation of receiving user selection are selectively performed. Then, a shooting option based conversion with respect to an image having full resolution may be processed as a background image. Accordingly, in the exemplary embodiment of the present invention, the user may rapidly confirm an effect preview image to which an effect is applied upon a shooting option based shooting operation.

Figure 12:
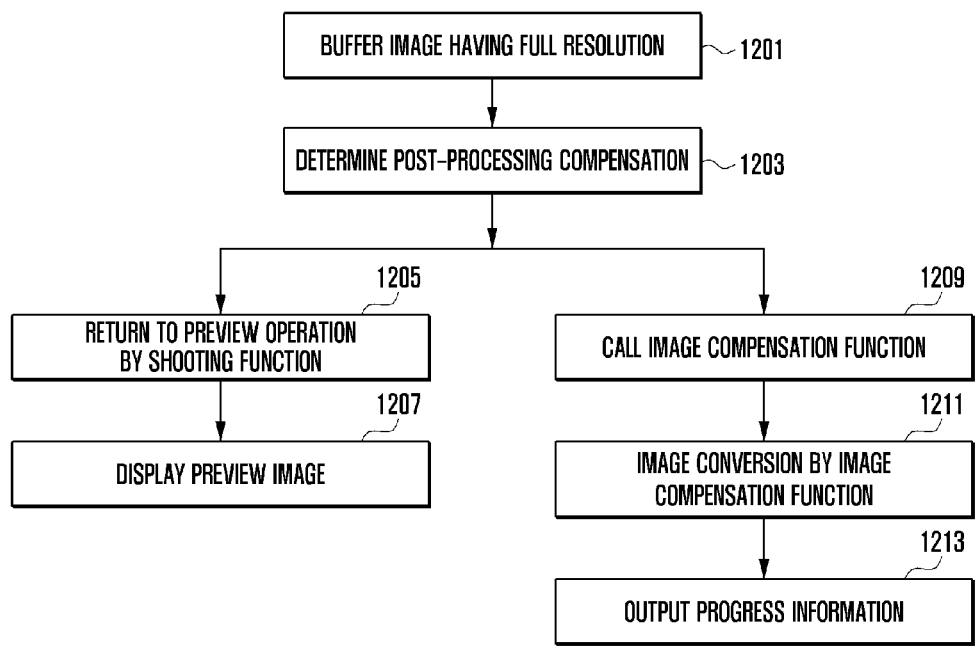
FIG. 12 is a flowchart illustrating an exemplary parallel processing operation during a procedure of shooting an image based on a shooting option in the portable device according to an exemplary embodiment of the present invention.

FIG. 12 is a flowchart illustrating exemplary operation of a parallel processing operation during a procedure of shooting an image based on a shooting option in the portable device according to an exemplary embodiment of the present invention.

FIG. 12 illustrates an operation of simultaneously processing a background with respect to a still image having a full resolution together with progress of the preview mode as described above. In other words, FIG. 12 illustrates a parallel processing operation performed when a portable device of the present invention shoots a shooting option based image.

Referring now to FIG. 12, upon shooting option based shooting operation, the controller 180 may control the camera 210 and the image processor 230 of the camera module 170 to independently perform a preview display processing operation in the preview mode and a conversion processing operation with respect to the image having full resolution in parallel operations.

In detail, as described above, at (1201) the controller 180 may convert (scale) the image having full resolution output through the camera 210 into a display image and buffer the converted display image through the display image buffer 237, and buffer the image having full resolution (still image) through the still image buffer 235.

At (1203), post-processing compensation for a still image buffered in the still image buffer 235 is determined according to a shooting command based on a shooting option of a user according to the foregoing procedure, the controller 180 progresses the post-processing compensation with respect to the still image as a background, and enters the preview mode to control display of preview of a next display image. As shown in FIG. 12, when the post-processing compensation is determined at step 1203, the controller 180 performs steps 1205 and 1207 and steps 1209 to 1213 in parallel in such a way that respective image processing steps may be independently operated.

for example, at (1205) the controller 180 returns to a preview operation by a shooting function, and at (1207) displays a preview image using a display image of a display image buffer 237.

In addition, at (1209), the controller 180 calls an image compensation function for processing compensation of an image having full resolution (still image), and at (1211) processes an option based image conversion set in the still image of the still image buffer 235 as a background by the image compensation function.

Next, at (1213) the controller 120 controls an information output indicating a progress degree of image conversion in progress as the background. For example, an item (e.g., icon, state bar, text, etc.) reporting a progress state of the image conversion may be provided to one region of a picture operated according to the shooting function or one region of a picture currently provided when an operation according to the shooting function is terminated and another operation is operated.

As described above, according to the exemplary embodiments of the present invention, post-processing compensation (e.g., set shooting option based effect application) is processed as a background by an independent process, and simultaneously the portable device enters a preview mode by an operated shooting shooting process to control preview display of a next display image.

According to the exemplary embodiments of the present invention as described above, when applying a shooting option with respect to a preview image, shooting option based image conversion with respect to a display image of a display image buffer 237 corresponding on display resolution of the display unit 130 rather than the image having full resolution may be processed and provided. In addition, upon shooting (capture) according to a shutter button input, the portable device returns to a preview mode, and shooting option based conversion for an image having full resolution (still image) of the still image buffer 235 may be processed as a background. More particularly, according to the exemplary embodiments of the present invention, upon shooting a photograph to which a shooting option is applied, post-processing compensation (e.g., effect application) for a still image is progressed to a background, and simultaneously the portable device enters the preview mode to directly shoot a next image.

The present invention has a configuration which enables a parallel operation by separating a shooting function (or shooting application) from an image compensation function (or image compensation application), calls the image compensation function upon the shutter button input or mode termination to acquire an image having full resolution corresponding to the display image upon the shutter button input, progresses image compensation thereof as a background, and turns to a preview mode by a shooting function.

In this case, in this exemplary embodiment of the present invention, an image compensation function (or image compensation application) for processing image compensation which is independently separated continues and progresses image conversion processing as a background until a given image conversion task is terminated (forced termination according to user selection, automatic device during a period according to user setting). Further, a background based image conversion processing may be continuously performed even when a shooting function (or shooting application) is terminated so that the camera module 170 is turned-off. Further, when the image conversion task is in progress, information on a progress situation including how much many percentages a process is progressed and indicating a quantity of pieces of an image conversion task have additionally progressed may be provided through a system (particularly, controller 180). The progress information may be provided on an executed picture (e.g., preview picture) by a shooting function when a shooting function (or shooting application). After the shooting function (or shooting application) is terminated, the progress information may be provided on a system UI or GUI (e.g., picture of an executed application (message picture, gallery picture, idle picture, etc.)).

Therefore, according to the exemplary embodiments of the present invention, unlike the related art, since a preview image for displaying a preview is converted by a display image other than an image having full resolution, the preview image can be rapidly processed and displayed. Further, according to the exemplary embodiments of the present invention, conversion processing for the image having full resolution (still image) by a separate image compensation function (or image compensation application) is progressed as a background so that a preview mode by a shooting function (or shooting application) may be directly performed. Accordingly, in the exemplary embodiments of the present invention, upon image conversion processing for displaying a preview image or image conversion processing of the image having full resolution, a delay time (e.g., shutter delay or shutter lag) being a period from an input of a shutter button to a next possible shooting can be significantly reduced. In addition, according to the exemplary embodiments of the present invention, for the reason that an image compensation function (or image compensation application) for compensating an image is operated separately from the shooting function (or shooting application), when an more improved image compensation algorithm is suggested, it is difficult to update and apply the image compensation function (or image compensation application) of the portable device.

The above-described embodiments according to the present invention can be implemented in hardware, firmware or via the execution of software or computer code that configures hardware for operation, and is stored on a non-transitory machine readable medium such as a CD ROM, DVD, RAM, a floppy disk, a hard disk, or a magneto-optical disk, such as a floptical disk or computer code downloaded over a network originally stored on a remote recording medium or a non-transitory machine readable medium and stored on a local non-transitory recording medium, so that the methods described herein can be loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" comprise hardware in the claimed invention. Under the broadest reasonable interpretation, the appended claims constitute statutory subject matter in compliance with 35 U.S.C. §101. The terms "unit" or "module" as used herein is to be understood under the broadest reasonable interpretation as constituting statutory subject matter under 35 U.S.C. §101 and does not constitute software per se. When a unit or module includes machine executable code it is to be understood that a non-transitory machine readable medium contains the machine executable code that is loaded into hardware such a processor or controller for execution.

As described above, according to the image processing method and apparatus of the present invention, a preview image for displaying a preview is converted by a display image other than an image having full resolution, permitting the preview image to be rapidly processed and displayed. Further, according to the exemplary embodiments of the present invention, conversion processing for the image having full resolution (still image) by a separate image compensation function (or image compensation application) is progressed as a background so that a preview mode by a shooting function (or shooting application) may be directly performed.

Accordingly, in the exemplary embodiments of the present invention, upon image conversion processing for displaying a preview image or image conversion processing of the image having full resolution, a delay time (e.g., shot to preview time) being a period from an input of a shutter button to a next possible shooting can be significantly reduced.

Further, according to the exemplary embodiments of the present invention, conversion processing for the image having full resolution (still image) by a separate image compensation function (or image compensation application) is progressed as a background so that a preview mode by a shooting function (or shooting application) may be directly performed.

Accordingly, the present invention implements an optimal environment for minimizing a delay time according shooting in a portable device having a shooting function, so that convenience for the user, utilization, convenience and competitive force of the portable device can be improved. The present invention may be simply implemented in various types of portable devices and corresponding various devices.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An image processing method comprising:
    displaying by a display unit a first preview image based on information acquired through a camera module in a preview mode and simultaneously, buffering by a still image buffer an image with full resolution based on information acquired through the camera module while the first preview image is displayed;
    receiving by a controller an input for selecting an option among a plurality of shooting options in the preview mode;
    displaying an effect preview image obtained by applying an effect according to the selected option to the first preview image; and
    in response to a shooting command for image capture, processing image compensation by the controller by applying the effect to the buffered image having full resolution corresponding to the displayed effect preview image as a background, and simultaneously, entering the preview mode to display a second preview image while image compensation is being processed.

2. The image processing method of claim 1, wherein applying an effect according to the selected option to the first preview image further comprises processing image conversion to the first preview image.

3. The image processing method of claim 1, wherein the buffering comprises:
the buffered image having full resolution that corresponds to a scaled image.

4. The image processing method of claim 3, wherein the processing of the image compensation comprises:
switching by the controller to display an image of a next frame buffered through a display image buffer; and
processing by an image processor image compensation by applying the shooting option to the image of the next frame having full resolution as the background.

5. The image processing method of claim 3, further comprising confirming a preset state of a review mode when the shooting option is received.

6. The image processing method of claim 5, further comprising:
processing, by an image processor, image compensation by applying the shooting option to the image having full resolution of the still image buffer when the review mode is not set, and simultaneously, returning to the preview mode to display a display image of a display image buffer as the preview; and
capturing and displaying the captured effect preview image when the review mode is set.

7. The image processing method of claim 6, further comprising:
determining by the controller whether the captured effect preview image is stored;
returning by the controller to the preview mode when a storage command is not generated to process a preview operation using the display image of the display image buffer; and
returning by the controller to the preview mode when the storage command is generated to convert a picture on which the captured effect preview image is displayed into a preview picture based on the display image, and processing the image compensation for the image having full resolution as the background.

8. The image processing method of claim 7, further comprising:
storing the compensated image having full resolution when the image compensation for the image having full resolution has terminated; and
selectively storing in a memory the effect preview image when performing the image compensation.

9. The image processing method of claim 1, wherein the processing of the image compensation comprises:
calling by the controller a compensation application for performing image compensation;
displaying the second preview image in the preview mode through a shooting application; and
processing, by an image processor, compensation of the image having full resolution corresponding to the first preview image according to the shoot option as the background through the called compensation application,
wherein the displaying the second preview image and the processing compensation as the background are performed in parallel operations.

10. The image processing method of claim 9, wherein the parallel operations are simultaneously performed.

11. The image processing method of claim 10, further providing a progress status with respect to the image compensation being processed as the background.

12. An image processing apparatus comprising:
a camera module configured to acquire an image having a full resolution, to scale the acquired image, to output the scaled image as a preview image and to buffer the image having full resolution;
a display unit configured to display the preview image in a preview mode;
a memory configured to store at least one program comprising machine executable code and an effect preview image to which an effect is applied based on the preview image and an image to which the effect is applied based on the image having full resolution; and
a controller configured to:
receive an input for selecting an option among a plurality of shooting options in the preview mode;
display the effect preview image obtained by applying the effect according to the selected option to the preview image;
receive a shooting command for image capture; and
process image compensation by applying the effect to the buffered image having full resolution corresponding to the displayed effect preview image when a shooting command is received, and simultaneously, to enter the preview mode to display another preview image while image compensation is being processed.

13. The image processing apparatus of claim 12, wherein the controller simultaneously performs a parallel operation.

14. The image processing apparatus of claim 12, wherein the camera module includes an image sensor, and a signal processor that receives an output from the image sensor converts the output into a digital image signal.

15. The image processing apparatus of claim 14, wherein the camera module includes an image processor that converts an image generated from the signal processor into a display image and processes the display image while in a preview mode.

16. The image processing apparatus of claim 12, wherein the machine executable code of the at least one program comprises commands for executing: buffering the image acquired from the camera module into both a display image and into an image having full resolution;
displaying the buffered display image;
processing image compensation by applying the shooting option to the display image when an input setting the shooting option is received while displaying the display image; and
processing image compensation by applying the shooting option to an image having full resolution as a background when a shutter button input is received, and simultaneously entering a preview mode to display a preview based on the display image of a next frame.

17. A computer readable recording non-transitory medium recording a program that contains machine executable code that when executed by a processor configures an electronic device to:
display by a display unit a first preview image based on information acquired through a camera module in a preview mode and simultaneously, buffer by a still image buffer an image with full resolution based on information acquired through the camera module while the first preview image is displayed;
receive by a controller an input for selecting an option among a plurality of shooting options in the preview mode;

display an effect preview image obtained by applying an effect according to the selected option to the first preview image; and in response to a shooting command for image capture, process image compensation by the controller by applying the effect to the buffered image having full resolution corresponding to the displayed effect preview image as a background, and simultaneously, enter the preview mode to display a second preview image while image compensation is being processed.

* * * * *